United States Patent [19]

Van Eenam

[11] Patent Number: 4,552,940
[45] Date of Patent: Nov. 12, 1985

[54] STYRENE VISCOSITY MODIFIER OF GRAFTED STARCH POLYMER SOLUTIONS

[75] Inventor: Donald N. Van Eenam, Des Peres, Mo.

[73] Assignee: Monsanto Company, St. Louis, Mo.

[21] Appl. No.: 647,770

[22] Filed: Sep. 6, 1984

Related U.S. Application Data

[63] Continuation-in-part of Ser. No. 585,731, Mar. 2, 1984, abandoned, which is a continuation-in-part of Ser. No. 501,577, Jun. 6, 1983, abandoned.

[51] Int. Cl.$^4$ ................................................. C08L 3/06
[52] U.S. Cl. .................................. 527/312; 527/313; 428/113; 428/147
[58] Field of Search ............... 527/312, 313; 427/258; 428/113, 147

[56] References Cited

U.S. PATENT DOCUMENTS 4,005,040  1/1977  Maher ................................. 527/314
4,375,535  3/1983  Kightlinger et al. ............... 527/314

Primary Examiner—John Kight
Assistant Examiner—Nathan M. Nutter
Attorney, Agent, or Firm—Jon H. Beusen; Wm. J. Farrington; Arnold H. Cole

[57] ABSTRACT

A grafted starch polymer solution having a lower viscosity through the incorporation of styrene into said grafted starch polymer.

17 Claims, No Drawings

STYRENE VISCOSITY MODIFIER OF GRAFTED STARCH POLYMER SOLUTIONS

CROSS REFERENCE TO RELATED APPLICATIONS

This application is a continuation-in-part of copending application Ser. No. 585,731, filed Mar. 2, 1984, now abandoned which is a continuation-in-part of application Ser. No. 501,577, filed June 6, 1983 now abandoned.

BACKGROUND OF THE INVENTION

1. Field of the Invention

The present invention relates to grafted starch polymer solutions and, more particularly, to the use of styrene to reduce the viscosity of the grafted starch polymer solution. Furthermore, the present invention relates to a process of preparing lower viscosity grafted starch polymer solutions by preparing such polymers with styrene.

2. Discussion of the Prior Art

Starch based polymers, more particularly grafted starch polymers, have been found useful as adhesives, coatings, and resins useful for improving the properties of paper. Starch based polymers are applied as solutions, typically aqueous. The use of starch based polymers has been hindered because of the generally high viscous nature of the solutions containing such starch polymers. Various procedures to reduce the viscosity of a starch based polymer solution have been utilized. One such method involves raising the temperature of the starch solution. Another method is to reduce the overall percent solids of the starch polymer in solution. Both of these alternatives are economically disadvantageous. Heating and maintaining the solution at an elevated temperature requires the use of complicated equipment. The use of more dilute solutions of starch polymers is disadvantageous since it would require the application of larger amounts of solution to obtain the necessary amount of polymer application and would also require the transportation of more dilute solutions which is expensive.

Another method of reducing the viscosity of a starch based polymer solution is through the use of enzyme modified starch which reduces the overall viscosity of the starch solution. While this method is advantageous for certain uses, it is sometimes desirous and essential that the starch not be modified with enzyme prior to use.

SUMMARY OF THE INSTANT INVENTION

The present invention is a grafted starch polymer and, more particularly, grafted starch polymer solutions wherein the viscosity is decreased through the use of styrene.

The specific amount of styrene will be dependent upon the type of starch used to prepare the grafted starch polymer, e.g., enzyme or nonenzyme modified starch, the specific percent solids of the particular grafted starch polymer solution, and the desired viscosity. Enzyme converted starch grafted polymers have a lower viscosity and thus require a lesser amount of styrene to achieve a desirable viscosity than would be required with a nonenzyme modified starch grafted polymer. Furthermore, the greater the percent solids of the grafted starch polymer in solution, the greater the amount of styrene required to achieve the desired viscosity. It has been found that the use of styrene will effect a reduction in viscosity of grafted starch polymer solutions at various concentration gradients and whether prepared from enzyme or nonenzyme modified starches.

DESCRIPTION OF THE PREFERRED EMBODIMENTS

The present invention generally relates to grafted starch polymers and, more particularly, to a grafted starch polymer solution wherein the viscosity is decreased through the use of styrene.

For the purpose of the present invention, the term "styrene" shall mean styrene and suitable derivatives of styrene with the only proviso being that the derivative not impair the ability of the styrene to reduce the viscosity of the grafted starch polymer. By "derivative" it is meant a compound incorporating the basic backbone of styrene (Ph—CH=CH$_2$) wherein one or more of the hydrogen of the phenyl group (Ph) are replaced with lower alkyl groups, such as, C$_1$-C$_3$ alkyls.

The grafted starch polymer is typically prepared by the graft polymerization of a vinyl monomer on to a starch substrate so as to form vinyl polymeric segments. As is well known in the art, there are various free radical polymerization methods useful for grafting vinyl monomers to starch, e.g., radiation, redox based free radical polymerization and mechanical fission. One particularly preferred method involves preparing a solution of the starch and vinyl monomers, adding thereto an appropriate free radical catalyst, and then carrying out the polymerization below the pasting temperature of the starch. Typical free radical catalysts which may be used are hydrogen peroxide, solution soluble organic peroxides and hydroperoxides, persulfates, and ceric ion. An activator, which is typically a mild reducing agent can also be added along with the catalyst. A typical activator disclosed in the art is sodium formaldehyde sulfoxalate. All of these methods are well-known to those skilled in the art and require no further discussion herein.

Starches useful in preparing the grafted starch polymers of the instant invention include various carbohydrates such as, for example, indian corn starch, rice starch, waxy maize starch, waxy sorghum starch, tapioca starch, wheat starch, potato starch, pearl starch and sweet potato starch, and derivatives thereof. The derivatives include oxidized starches, hydroxyalkylated starches, carboxyalkylated starches, various solubilized starches, enzyme modified starches, etc. Generally, any starch can be used from which the vinyl monomers can be polymerized thereupon.

Vinyl monomers useful for the practice of the present invention include the various unsaturated organic compounds possessing a vinyl group which is available to undergo free radical or an equivalent polymerization to produce vinyl polymeric segments. In accordance with the present invention, at least 50 weight percent of the vinyl polymeric segment free radically grafted from the starch substrate is acrylamide monomer residue. The remaining weight percent of the vinyl polymeric segment may be mixtures of other vinyl monomers. Preferably, these vinyl monomers other than acrylamide may be used to provide the grafted starch polymer of the present invention with anionic or cationic charges which as is well known to those skilled in the art is useful in preparing paper by differing processes. Included among these compounds are compounds having the acrylic group as the polymerizable nucleus, such as acrylic and methacrylic acids, and esters thereof (including the methyl, ethyl, and butyl esters); acrylonitrile; vinyl chloride; vinyl acetate and other vinyl esters; vinyl pyridine and vinyl pyrrolidone; vinyl ketones; vinylidene compounds, such as vinylidene chloride; allylidene compounds such as allylidiene diacetates; conjugated diene monomers such as butadiene-1,3, isoprene, chlorobutadiene-1,3 and so on. Other vinyl monomers useful are those which will impart a cationic charge to the grafted polymer, such as diallylamine and its respective salts, N-alkyl diallylamine and its respective salts, diallyl dialkyl ammonium quaternary salts, N,N-dialkylaminoalkyl acrylate and methacrylate and their respective salts, N,N-dialkyl amino alkyl acrylamide and methacrylamide and the respective salts and Ar-vinylbenzyldialkyl amine and the respective salts. It should be noted that the vinyl monomers used to prepare the vinyl polymeric segments of the present invention shall not include those vinyl monomers which will impair the grafted starch polymer of the present invention's usefulness as a dry strength additive.

As stated above, the typical method for producing grafted starch polymers of the present invention involves preparing a solution of the starch, vinyl monomer(s) and appropriate catalyst with or without accelerator and then maintaining the temperature below the pasting temperature of the starch. Of the various useful solvents, such as water, alcohol and ethers, the preferred solvent of the present invention is water.

It has been determined that styrene reduces the overall viscosity of a grafted starch polymer solution even when added in minimal amounts. Thus the amount of styrene used to prepare the grafted starch polymer solution will be dependent upon the desired final viscosity. The determination of the sufficient amount of styrene to achieve the desired viscosity can be made by one skilled in the art by typical means, generally, a sufficient amount of the viscosity reducing material of the present invention is added to significantly reduce the viscosity of the grafted starch polymer solution. By a significant reduction in viscosity, it is meant at least a 25% reduction, preferably greater than 50% with reductions of over a hundredfold being obtainable in comparison to solutions containing the same grafted starch polymer absent the viscosity reducing material at the same solids content. Furthermore, the amount of styrene used to prepare grafted starch polymers will also be dependent upon the percent of solids in the solution and the type of starch being used.

Enzyme modified starches typically have a viscosity of about 500 to about 30,000 centipoise relative to unmodified starches which have a viscosity range from between about 1000 and about 50,000 centipoise for solutions ranging between about 5 and 15 percent solids. Thus, the amount of styrene used to prepare enzyme modified starches would be significantly lower than that used to prepare unmodified starch to achieve the same desired final viscosity.

As stated above, the percent solids of the solution will also influence the amount of styrene used to achieve the desired viscosity. Typical prior art solutions have percent solids ranging between about 5 and about 15. While these types of solutions are generally of low viscosity, the additional use of styrene will further reduce the overall viscosity at the same solids level. A solution for the purpose of the present invention generally has between about five (5) and about fifty (50) percent solids determined by drying a one (1) gram sample at one hundred twenty (120) degrees centigrade for one (1) hour.

The styrene is added prior or during the polymerization between the vinyl monomer and the starch substrate. The styrene reacts with and becomes part of the grafted starch polymer.

The final prepared grafted starch polymer will have from about five (5) weight percent to about ninety-five (95) weight percent starch and from about ninety-five (95) weight percent to about five (5) weight percent vinyl polymeric segments wherein the vinyl polymeric segment is provided with a sufficient amount of styrene to reduce the viscosity of an aqueous solution of the grafted starch polymer.

The amount of styrene used to prepare the grafted starch polymers in accordance with the present invention will range between about 0.1 weight percent and about 10 weight percent of the grafted starch polymer, exclusive of the styrene, preferably between about 0.5 and about 1.5 weight percent.

Another feature of the present invention involves the preparation of a high solids solution from between about 10 and about 40 percent solids, preferably between about 25 and about 30 percent solids while incorporating therein the viscosity reducing material of the present invention and thus obtaining a final high solids solution having a desired viscosity within the range of about 1000 and about 15,000 centipoise, preferably about 1000 to about 5000 centipoise. The solids content of the solution is determined as stated above while viscosities can be determined by either the Gardner or Brookfield methods.

It has further been found that the combination of the use of styrene and crotonic acid, or an ammonium halide such as allyltrimethyl ammonium chloride or diallyl dimethyl ammonium chloride or sodium 3-allyloxy-2-hydroxypropyl sulfonate further reduces the viscosity of a grafted starch polymer solution.

EXAMPLES 1-17

The following examples, 1 through 17, illustrate the reduction in viscosity of an grafted starch polymer solution through the use of styrene. The grafted starch polymer solutions in Examples 1 through 17 were prepared from enzyme modified hydroxyethylated starch, acrylamide and other materials with only Examples 6-13 containing styrene in the presence of ammonium persulfate catalyst. Each example was prepared by using 50 gms. of the enzyme modified hydroxyethylated starch and 0.12 gms of the ammonium persulfate catalyst. The amount of acrylamide, styrene and additional materials used to prepare each example is indicated below in Table 1. All of the examples were prepared by placing in an aqueous solution the specified materials into a 50 mm Erlemeyer flask which was equipped with a magnetic stirrer bar. Each example was adjusted so that the final solution had about 40% total solids determined by drying a 1 gram sample at 120° C. for 1 hour. The flask was stoppered after being nitrogen sparged and placed within a hot water bath maintained at a temperature between 70° and 80° C. for a period of about two hours.

Also provided in Table 1 are the viscosities, in centipoise, for each example. As seen in Table 1, those examples which were not prepared using styrene exhibited higher viscosities, typically greater than 20,000 centipoise (see Examples 1 through 5, 15 and 16). The remaining examples exhibited lower viscosities through the use of styrene and the other materials described above. The viscosities were determined by the Brookfield method.

TABLE 1

| EX. | ACRYL-AMIDE (GRAMS) | STYRENE (GRAMS) | OTHER MATERIALS (GRAMS) | VISCOSITY (CENTIPOISE) |
|---|---|---|---|---|
| 1 | 5.0 | — | — | >20,000 |
| 2 | 4.5 | — | Acrylic Acid (0.5) | >20,000 |
| 3 | 4.5 | — | Crotonic Acid (0.5) | >20,000 |
| 4 | 4.5 | — | DMAEMA (0.5) | >20,000 |
| 5 | 4.5 | — | ATMAC (0.5) | >20,000 |
| 6 | 4.5 | (0.5) | — | 4,600 |
| 7 | 4.5 | (0.5) | Acrylic Acid (0.25) | 15,000 |
| 8 | 4.5 | (0.5) | Maleic Acid (0.25) | 10,000 |
| 9 | 4.5 | (0.5) | Crotonic Acid (0.25) | 1,400 |
| 10 | | (0.5) | COPS-1 (0.25) | 2,270 |
| 11 | 4.5 | (0.5) | DMAEMA (0.25) | 15,000 |
| 12 | 4.5 | (0.5) | DADMAC (0.25) | 3,000 |
| 13 | 4.5 | (0.5) | ATMAC (0.25) | 1,070 |
| 14 | 4.5 | — | Fumaric Acid (0.5) | >20,000 |
| 15 | 4.5 | — | N—t-BuAA (0.5) | >20,000 |

NOTES
1. DMAEMA = N,N—dimethylaminoethyl methacrylate
2. ATMAC = Allyltrimethyl ammonium chloride
3. COPS-1 = Sodium 3-allyloxy-2-hydroxypropyl sulfonate
4. DADMAC = diallyl dimethyl ammonium chloride
5. N—t-BuAA = N-t-butyl acrylamide While the preferred embodiments have been described and illustrated, various modifications and substitutions may be made thereto within the scope of the present invention. Accordingly, it is to be understood that the present invention has been described by way of illustration and not limitation.

What is claimed is:

1. A grafted starch polymer comprising from about 5 weight percent to about 95 weight percent of a starch substrate; from about 95 to about 5 weight percent of vinyl polymer segments comprising at least 50% by weight of said vinyl polymeric segments acrylamide monomer residue; and a sufficient amount of styrene to significantly reduce the viscosity of a solution of said graft polymer.

2. The polymer of claim 1 wherein said grafted starch polymer is in an aqueous solution.

3. The polymer of claim 2 wherein said polymer in said aqueous solution ranges from between about 25 and about 30% solids.

4. The polymer of claim 1 wherein said styrene is from about 0.1 to about 10 weight percent of the grafted starch polymer.

5. The polymer of claim 4 wherein said styrene is from about 0.5 to about 1.5 weight percent of the grafted starch polymer.

6. The polymer of claim 5 wherein starch substrate is a nonenzyme modified starch.

7. The polymer of claim 6 wherein said nonenzyme modified starch is a hydroxyalkylated or carboxyalkylated starch.

8. The polymer of claim 7 wherein said polymer is in an aqueous solution ranging between about 25 to 30 percent weight solids.

9. An aqueous solution comprising about 25 to about 30 percent solids of a grafted starch polymer comprising about 5 to about 95 weight percent of a starch substrate; about 95 to about 5 weight percent of vinyl polymeric segments comprising at least 50% by weight of said vinyl polymeric segments acrylamide monomer residue; and a sufficient amount of styrene to significantly reduce the viscosity of said solution.

10. A solution of claim 8 wherein said styrene ranges from about 0.1 weight percent to about 10 weight percent of the grafted starch polymer.

11. A solution of claim 9 wherein said styrene ranges from about 0.5 to about 1.5 weight percent of the grafted starch polymer.

12. A solution of claim 9 having a viscosity within the range of about 1000 to about 8000 centipoise.

13. A fibrous substrate having been treated with a solution comprised of between about 25 and about 30 percent solids of a grafted starch polymer comprised of from about 5 to about 95 weight percent of a starch substrate; about 95 to about 5 weight percent of vinyl polymeric segments comprising at least 50% by weight of said vinyl polymeric segments acrylamide monomer residue; and a sufficient amount of styrene to significantly reduce the viscosity of said solution.

14. A fibrous substrate of claim 13 wherein said solution is aqueous.

15. A fibrous substrate of claim 14 wherein said aqueous solution has a viscosity within a range of between about 1000 and about 8000 centipoise.

16. A fibrous substrate of claim 15 wherein said styrene ranges from about 0.5 weight percent and about 10 weight percent of the grafted starch polymer.

17. A fibrous substrate of claim 15 wherein said styrene ranges from between about 0.5 and about 1.5 weight percent of said grafted starch polymer.

* * * * *